United States Patent
Yokoyama et al.

(10) Patent No.: US 6,973,270 B2
(45) Date of Patent: Dec. 6, 2005

(54) REFLECTION ROUTING METHOD IN OPTICAL PACKET SWITCHING NETWORK AND OPTICAL PACKET SWITCH FOR REFLECTION ROUTING

(75) Inventors: Hiroyuki Yokoyama, Saitama (JP); Hajime Nakamura, Saitama (JP); Toshio Kato, Tokyo (JP); Hiroki Furuya, Tokyo (JP); Hiroyuki Fukuoka, Saitama (JP)

(73) Assignee: KDDI Corporation, Tokyo (JP)

( * ) Notice: Subject to any disclaimer, the term of this patent is extended or adjusted under 35 U.S.C. 154(b) by 651 days.

(21) Appl. No.: 09/938,734

(22) Filed: Aug. 27, 2001

(65) Prior Publication Data

US 2002/0024700 A1 Feb. 28, 2002

(30) Foreign Application Priority Data

Aug. 29, 2000 (JP) .............................. 2000/259196

(51) Int. Cl.[7] .......................................... H04L 12/56
(52) U.S. Cl. ........................ 398/57; 398/49; 398/45; 398/54; 398/51
(58) Field of Search ................. 398/58, 57, 49, 398/45, 54, 51; 370/388, 400

(56) References Cited

U.S. PATENT DOCUMENTS 5,617,413 A * 4/1997 Monacos .................... 370/400
5,799,015 A * 8/1998 Bennett et al. ............. 370/388

* cited by examiner

*Primary Examiner*—M. R. Sedighian
*Assistant Examiner*—David C. Payne
(74) *Attorney, Agent, or Firm*—Armstrong, Kratz, Quintos, Hanson & Brooks, LLP.

(57) ABSTRACT

A routing control method in an optical packet switching network including a plurality of optical packet switches. Each optical packet switch has a plurality of output ports used for sending packets to other optical packet switches, respectively. The method particularly includes a step of, in a one optical packet switch, monitoring congestion conditions at its output ports, a step of, in the one optical packet switch, transferring packets to be stored in a one output port that is judged in the monitoring step as in congestion, to other output port that is judged in the monitoring step as not in congestion, a step of, from the one optical packet switch, sending the packets as reflection packets via the other output port to an other optical packet switch corresponding to the other output port, and a step of, from the other optical packet switch, returning the reflection packets to the one optical packet switch.

12 Claims, 4 Drawing Sheets

REFLECTION ROUTING METHOD IN OPTICAL PACKET SWITCHING NETWORK AND OPTICAL PACKET SWITCH FOR REFLECTION ROUTING

FIELD OF THE INVENTION

The present invention relates to a reflection routing method in an optical packet switching network with a plurality of optical packet switches and to an optical packet switch used in the network for the reflection routing.

DESCRIPTION OF THE RELATED ART

In a conventional optical packet switch, when transmitting arrived packets through one output port, these arrived packets are temporarily stored in a transmission buffer in the output port and then the stored packets are fetched one by one to avoid packet collision. In general, such buffer is realized by using optical fibers as delay lines.

However, since there are limits in the physical length and in the number of the optical fibers accommodated in the optical packet switch, it is very difficult to increase a capacity of the buffer. The buffer now has in fact a small capacity for storing up to about 10–20 packets of 1,500 byte.

Under these circumstances, when a line-utilization rate or factor increases, a buffer overflowing rate or a packet loss rate will increases causing the transmission quality to deteriorate. Thus, in a network using optical packet switches, it is impossible to increase the line-utilization rate.

SUMMARY OF THE INVENTION

It is therefore an object of the present invention to provide a reflection routing method in an optical packet switching network and an optical packet switch for the reflection routing, whereby a line-utilization rate can be improved without deteriorating a packet loss rate.

The present invention concerns a routing control method in an optical packet switching network including a plurality of optical packet switches. Each optical packet switch has a plurality of output ports used for sending packets to other optical packet switches, respectively. According to the present invention, particularly, the method includes a step of, in a one optical packet switch, monitoring congestion conditions at its output ports, a step of, in the one optical packet switch, transferring packets to be stored in a one output port that is judged in the monitoring step as in congestion, to other output port that is judged in the monitoring step as not in congestion, a step of, from the one optical packet switch, sending the packets as reflection packets via the other output port to an other optical packet switch corresponding to the other output port, and a step of, from the other optical packet switch, returning the reflection packets to the one optical packet switch.

Since a line between the optical packet switches is used as a delay line, namely as a transmission buffer, effective capacity of the transmission buffer in the switch can be increased. As a result, a line-utilization rate can be improved without deteriorating a packet loss rate.

FIG. 1 illustrates a relationship between a line-utilization rate and a packet loss rate due to overflowing of packets from a buffer. This figure indicates change in the packet loss rate depending upon the number K of buffers (buffer capacity).

As will be noted from the figure, in case of K=20 (buffer capacity is 20 packets) and a line-utilization rate of $\rho=47\%$, a packet loss rate is $10^{-7}$. If the buffer capacity increases as K=30, a packet loss rate reduces to $10^{-10}$ under a line-utilization rate of $\rho=47\%$. Contrary to this, if the packet loss rate of $10^{-7}$ is enough, the line-utilization rate can be increased to $\rho=60\%$. This means that, in an optical packet switching, if the transmission buffer capacity increases, the line-utilization rate will increase. Therefore, in the present invention, effective capacity of the transmission buffer is increased to improve a line-utilization rate without deteriorating a packet loss rate.

It is preferred that the transferring step includes selecting the other output port from output ports judged in the monitoring step as not in congestion so as to provide a reflection route with the shortest transmission delay time.

It is preferred that the transferring step includes selecting the other output port in random from output ports judged in the monitoring step as not in congestion so as to provide reflection routes with transmission delay times within a predetermined range.

It is preferred that the transferring step includes sequentially selecting the other output port from output ports judged in the monitoring step as not in congestion so as to provide reflection routes with transmission delay times within a predetermined range.

It is also preferred that the method further includes a step of storing the reflection packets returned from the other optical packet switch to the one output port if it is judged in the monitoring step that this one output port is not in congestion.

It is preferred that the method further includes a step of storing the reflection packets returned from the other optical packet switch to other output port that is judged in the monitoring step as not in congestion if it is judged in the monitoring step that the one output port is in congestion, and that the sending step and returning step are repeatedly performed. Thus, the effective capacity of the transmission buffer of the one output port will increase.

It is also preferred that the method further includes a step of sending the reflection packets returned from the other optical packet switch earlier than packets stored in the one output port. Thus, the transmission delay of packets due to reflection routing can be reduced.

It is further preferred that the method further includes a step of counting the number of reflection and a step of abandoning packets when a counted number reaches a predetermined number. Thus, abnormal cyclic reflections of packets between the switches can be prevented.

Also, according to the present invention, a routing control method in an optical packet switching network including at least first, second and third optical packet switches includes a step of, in the first optical packet switch, when a first output port used for sending optical packets to the second optical packet switch is in congestion and a second output port used for sending optical packets to the third optical packet switch is not in congestion, sending optical packets to be sent to the second optical packet switch to the third optical packet switch via the second output port as reflection packets, a step of, in the third optical packet switch, returning the reflection packets received from the first optical packet switch to the first optical packet switch, and a step of, in the first optical packet switch, when the first output port is not in congestion, sending the reflection packets to the second optical packet switch via the first output port.

It is preferred that the method further includes, in the first optical packet switch, monitoring congestion conditions at the first and second output ports.

It is preferred that the sending step includes selecting the second output port so as to provide a reflection route with the shortest transmission delay time.

It is preferred that the sending step includes selecting the second output port in random so as to provide reflection routes with transmission delay times within a predetermined range.

It is also preferred that the sending step includes sequentially selecting the second output port so as to provide reflection routes with transmission delay times within a predetermined range.

It is further preferred that the method further includes a step of storing the reflection packets returned from the third optical packet switch to the second output port if the first output port is in congestion, and that the reflection packets sending step and returning step are repeatedly performed.

It is preferred that the method further includes a step of sending the reflection packets returned from the third optical packet switch earlier than packets stored in the first output port.

It is also preferred that the method further includes a step of counting the number of reflection and a step of abandoning packets when a counted number reaches a predetermined number.

Furthermore, according to the present invention, an optical packet switch includes a plurality of output ports used for sending packets to other optical packet switches, a unit for monitoring congestion conditions at the output ports, a unit for transferring packets to be stored in a one output port that is judged by the monitoring unit as in congestion, to other output port that is judged by the monitoring unit as not in congestion, a unit for sending the packets as reflection packets via the other output port to other optical packet switch corresponding to the other output port, and a unit for returning reflection packets to other optical packet switch that sent these reflection packets.

Further objects and advantages of the present invention will be apparent from the following description of the preferred embodiments of the invention as illustrated in the accompanying drawings.

DESCRIPTION OF THE PREFERRED EMBODIMENTS

Figure 1:
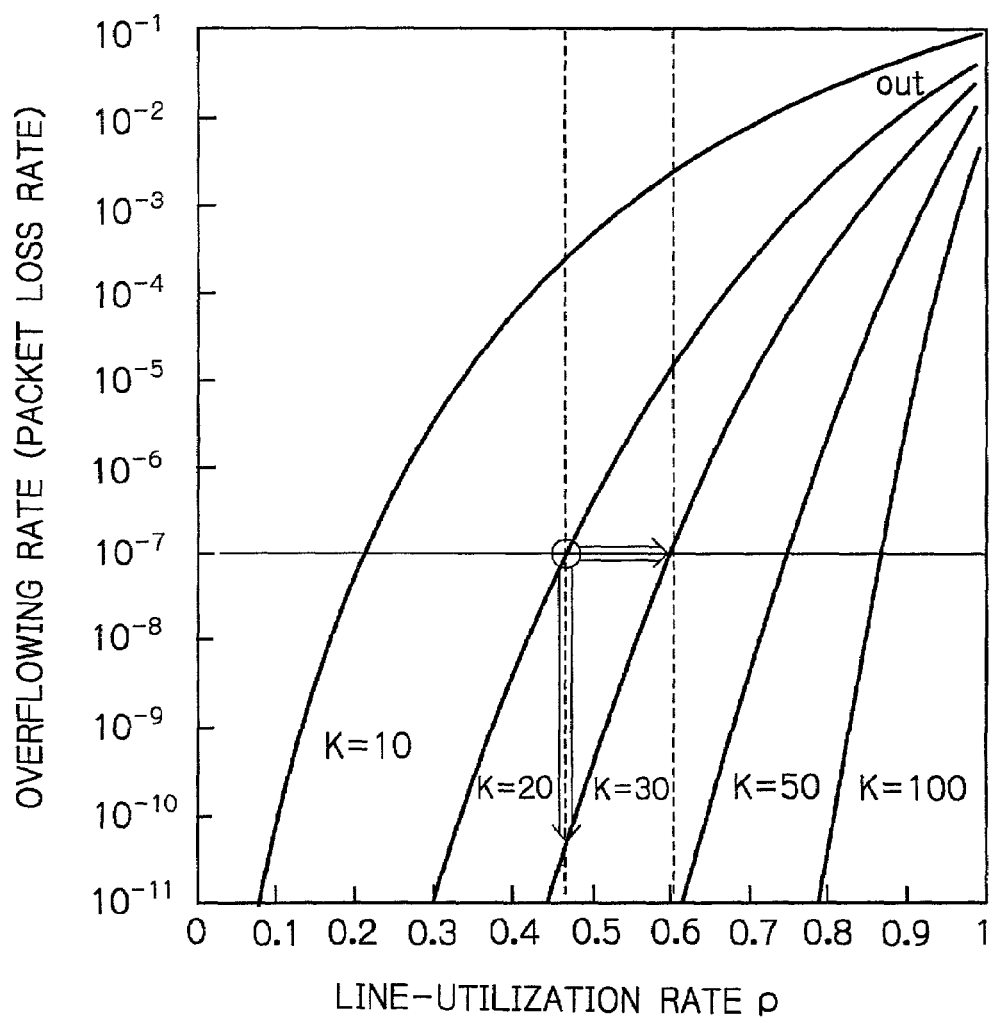
FIG. 1, already described, shows a graph illustrating a relationship between a line-utilization rate and a packet loss rate with respect to a buffer capacity.
Figure 2:
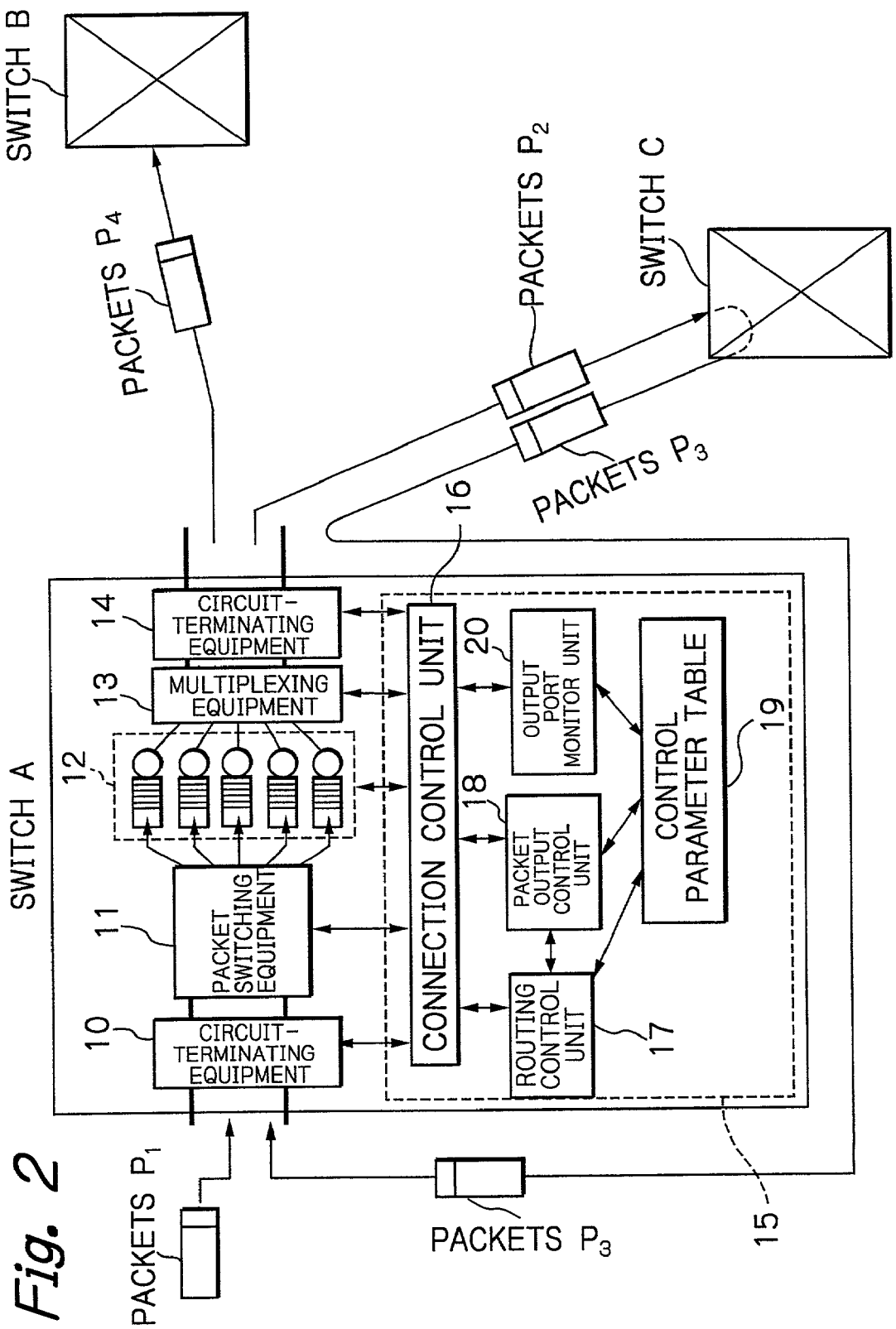
FIG. 2 shows a block diagram schematically illustrating a system configuration of an optical packet switching network as a preferred embodiment according to the present invention.

FIG. 2 schematically illustrates a system configuration of an optical packet switching network as a preferred embodiment according to the present invention. In the figure, only three optical packet switches A, B and C in the network are illustrated.

As shown in the figure, the switch A has an input circuit-terminating equipment 10, a packet switching equipment 11, a transmission buffer equipment 12, a multiplexing equipment 13, an output circuit-terminating equipment 14 and a control equipment 15. The buffer equipment 12 has a plurality of buffers for storing packets to be sent to a plurality of switches, respectively. The control equipment 15 includes a connection control unit 16, a routing control unit 17, a packet output control unit 18, a control parameter table 19 and an output port monitor unit 20. The switches B and C may have the similar circuit configuration as that of the switch A.

Figure 3:
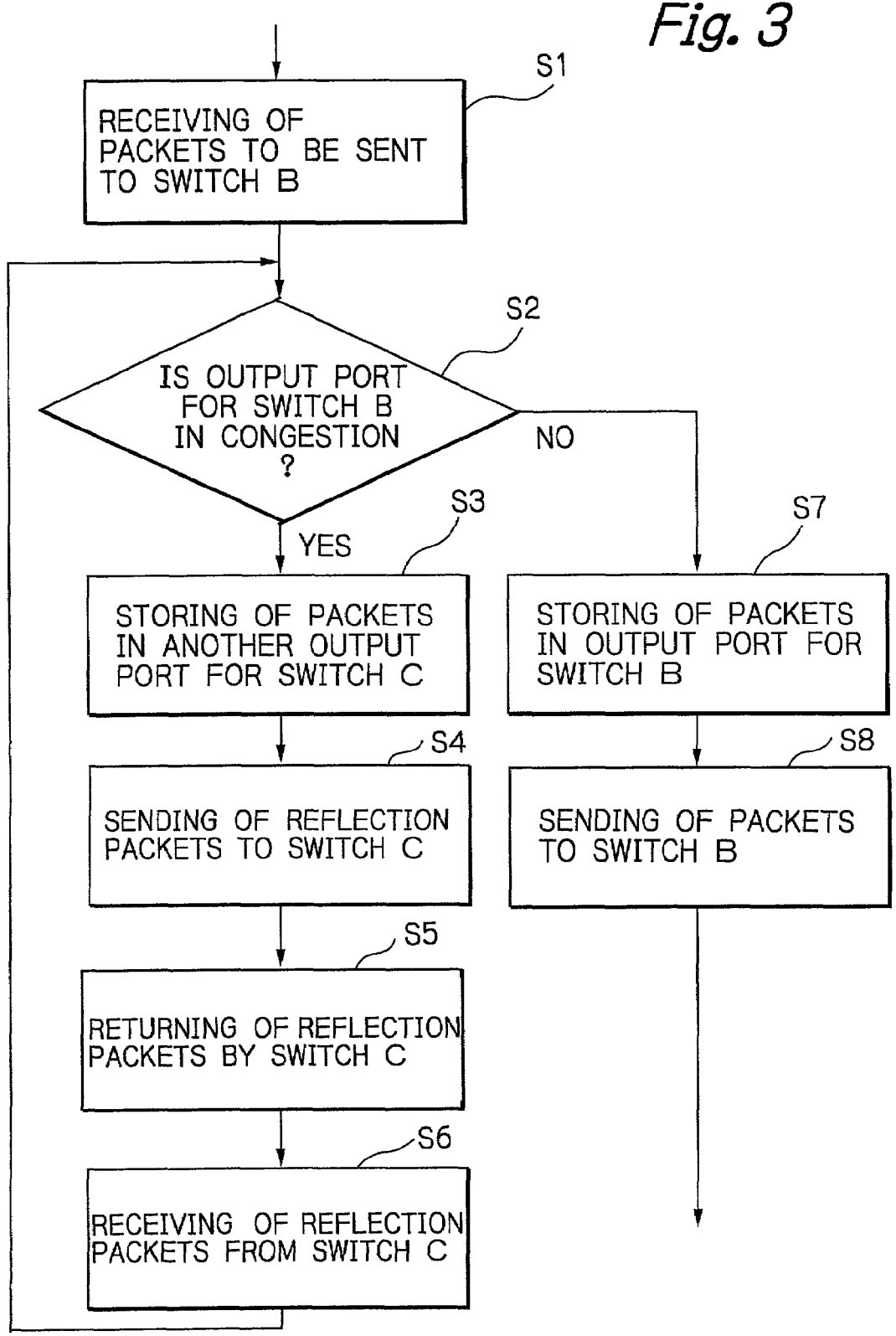
FIG. 3 shows a flow chart illustrating operations in the embodiment shown in FIG. 2.

Hereinafter, operations of this system will be described with reference to the flow chart shown in FIG. 3.

First, the switch A receives optical packets $P_1$ to be send to the switch B. These packets $P_1$ are applied to the circuit-terminating equipment 10 (step S1).

The output port monitor 20 always monitors the buffer equipment 12 with transmission buffers to know whether congestions occur in the buffers of output port for sending packets to the respective switches or not. This monitoring may be achieved for example by measuring input/output energy amount at each buffer.

If it is judged that the buffer of the output port for sending packets to the switch B is in congestion (step S2), the routing control unit 17 controls the packet switching equipment 11 so that these packets $P_1$ to be sent to the switch B are stored in another buffer of another output port which is not in congestion (step S3).

This another buffer of the another output port may be sequentially selected from one that provides a reflection route with the shortest transmission delay time (shortest route selection method). If the buffer or the output port is selected by this way, time delay of the packets due to change in its sending order will be reduced to occur no retransmission control as will be described in detail later.

The another buffer or the another output port may be selected in random from these that provide reflection routes with transmission delay times within a predetermined range (random selection method). The predetermined range will be defined by the minimum transmission delay time RTTmin (>5 $\mu$sec) and the maximum transmission delay time RTTmax.

The another buffer or the another output port may be sequentially selected from one that provides a reflection route with a transmission delay time within the predetermined range (cyclic selection method).

Control parameters such as a threshold for the judgment of congestion with respect to the buffers of the output ports, and conditions for selecting a reflection route to be switched may be preliminarily stored in the control parameter table 19.

In this embodiment, supposed that this another buffer or the another output port is selected to a buffer or an output port for storing packets to be sent to the switch C.

The packets stored in the transmission buffer for the switch C are indicated as reflection packets $P_2$ by setting a flag, and then sent to the switch C via the multiplexing equipment 13 and the circuit-terminating equipment 14 (step S4).

The switch C receives the reflection packets $P_2$, and will return these packets to the switch A when detecting the received packets $P_2$ are reflection packets (step S5). In modification, the switch C may have a reflective functions at its input/output interface itself.

In order to prevent cyclic reflection, the switch A may have a TTL (time to live) counter that will be reset to an initial value $TTL_{Limit}$ when the reflection packets are sent to the switch C for the first time. The content of the TTL counter will be decremented by one at each reflection and when reaches zero the packets will be abandoned.

The reflected packets $P_3$ from the switch C is entered into the switch A again (step S6). These packets $P_3$ are applied to the circuit-terminating equipment 10, and then switched by the packet switching equipment 11 so as to be stored in the buffer of the output port for sending packets to the switch B if it is not in congestion (step S7). Then, the stored packets $P_4$ will be sent to the switch B via the multiplexing equipment 13 and the circuit-terminating equipment 14 (step S8).

If the buffer of the output port for sending packets to the switch B is in congestion, operations at steps S3–S6 are repeated.

The packet output control unit 18 can put a high priority on the reflection packets for sending to the switch B than another packets already stored in the transmission buffer for the switch B. For example, the packet output control unit 18 may directly apply the reflection packets to the multiplexing equipment 13 without storing it in the transmission buffer 12. If, in the transmission buffer, there are packets with a sequence number to be sent earlier than the reflection packets, however, it should be controlled to send these reflection packets after the sending of the earlier packets.

According to the present invention, no retransmission will occur even if the packet transmitting and/or receiving order changes. Hereinafter, this reason will be described with reference to FIG. 4. The communication protocol adopted is for example TCP/IP. As is known, in TCP/IP, if the sending side receives three ACK packets with the same sequence number, retransmission occurs and thus throughput will lower.

Figure 4:
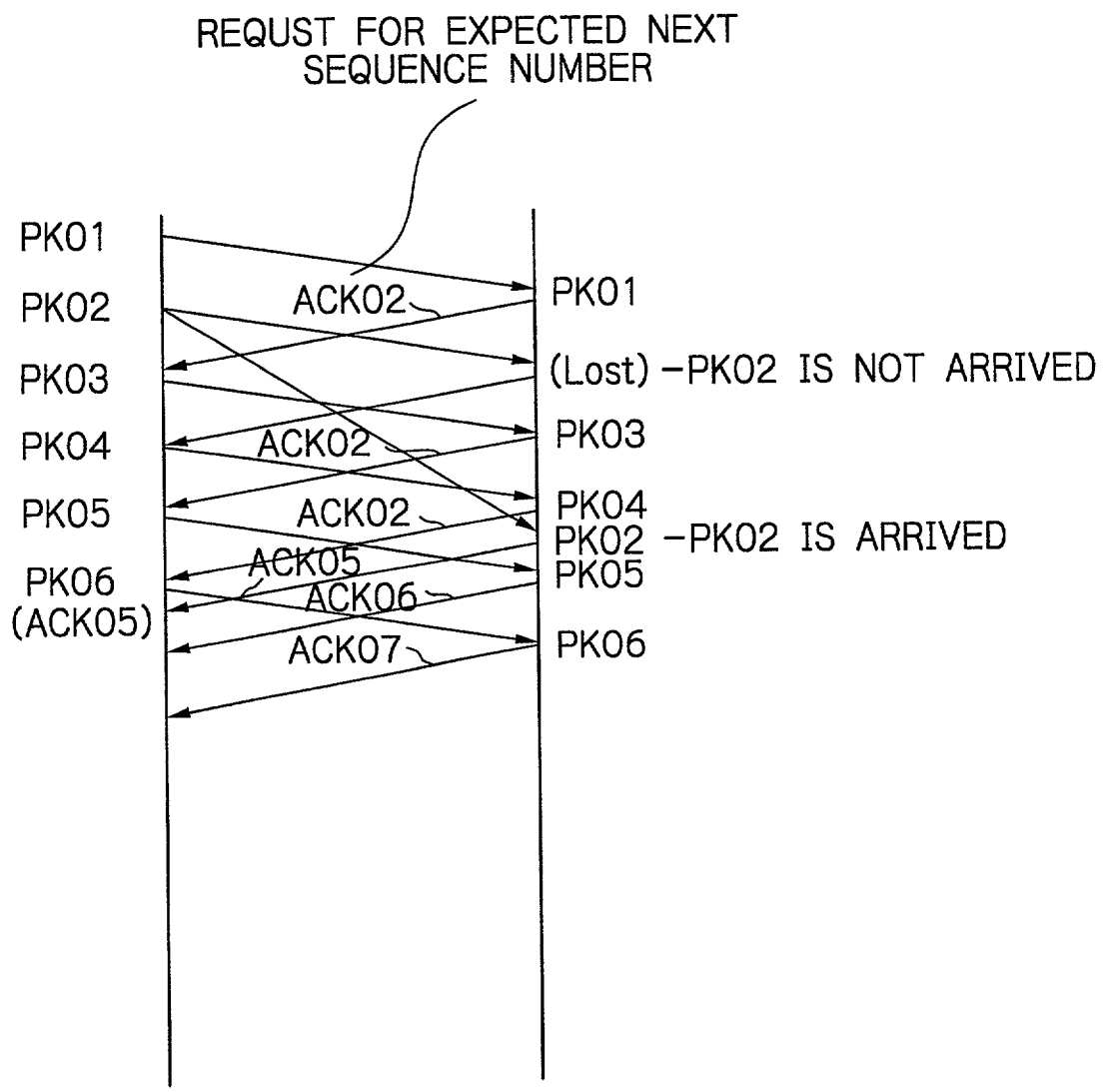
FIG. 4 shows a sequence diagram illustrating that no retransmission is necessary according to the present invention even if the packet transmitting and/or receiving order changes.

Suppose that packets PK02 is delayed due to the above-mentioned reflection route control and packets PK03 and PK04 are arrived earlier as shown in FIG. 4. With the assumption that an output traffic amount is 6.0 Mbps, a line-utilization rate is 100%, a packet length is 1500 bytes/pk, a packet arrival rate is 500 pks/s and a packet interval is 2.0 msec, in order to prevent occurrence of retransmission, it is required to limit the delay time due to the reflection routing within 4.0 msec. As mentioned before, it is necessary to keep the packet transmitting and/or receiving order changes within three packets to avoid the retransmission. To control the packet order changes up to two packets, the delay time due to the reflection routing should be equal to or less than two packet intervals of 2.0×2=4.0 msec.

This delay time of 4.0 msec corresponds to a length of an optical fiber of about 800 km, and such long length of optical fiber will not be utilized in reflection routing control in a normal optical packet switching network. In other words, retransmission will not be executed under TCP/IP in the normal optical packet switching network even if a reflection routing control is performed and therefore the throughput never reduces.

As mentioned above, according to this embodiment, since a line between the switches is used as a delay line, namely as a transmission buffer, effective capacity of the transmission buffer in the switch can be increased. As a result, a line-utilization rate can be improved without deteriorating a packet loss rate.

Many widely different embodiments of the present invention may be constructed without departing from the spirit and scope of the present invention. It should be understood that the present invention is not limited to the specific embodiments described in the specification, except as defined in the appended claims.

What is claimed is:

1. A routing control method in an optical packet switching network including a plurality of optical packet switches, each optical packet switch having a plurality of output ports used for sending packets to other optical packet switches, respectively, said method comprising the steps of:
   in a one optical packet switch, monitoring congestion conditions at its output ports;
   in said one optical packet switch, transferring packets to be stored in a one output port that is judged in said monitoring step as in congestion, to other output port that is judged in said monitoring step as not in congestion;
   from said one optical packet switch, sending the packets as reflection packets via said other output port to an other optical packet switch corresponding to said other output port; and
   from said other optical packet switch, returning said reflection packets to said one optical packet switch, wherein said transferring step comprises selecting said other output port in random from output ports judged in said monitoring step as not in congestion so as to provide reflection routes with transmission delay times within a predetermined range.

2. A routing control method in an optical packet switching network including a plurality of optical packet switches, each optical packet switch having a plurality of output ports used for sending packets to other optical packet switches, respectively, said method comprising the steps of:
   in a one optical packet switch, monitoring congestion conditions at its output ports;
   in said one optical packet switch, transferring packets to be stored in a one output port that is judged in said monitoring step as in congestion, to other output port that is judged in said monitoring step as not in congestion;
   from said one optical packet switch, sending the packets as reflection packets via said other output port to an other optical packet switch corresponding to said other output port; and
   from said other optical packet switch, returning said reflection packets to said one optical packet switch, wherein said transferring step comprises sequentially selecting said other output port from output ports judged in said monitoring step as not in congestion so as to provide reflection routes with transmission delay times within a predetermined range.

3. The method as claimed in either claim 1 or claim 2, wherein said method further comprises a step of storing the reflection packets returned from said other optical packet switch to said one output port if it is judged in said monitoring step that this one output port is not in congestion.

4. The method as claimed in either claim 1 or claim 2, wherein said method further comprises a step of storing the reflection packets returned from said other optical packet switch to other output port that is judged in said monitoring step as not in congestion if it is judged in said monitoring step that said one output port is in congestion, and wherein said sending step and returning step are repeatedly performed.

5. The method as claimed in either claim 1 or claim 2, wherein said method further comprises a step of sending the reflection packets returned from said other optical packet switch earlier than packets stored in said one output port.

6. The method as claimed in either claim 1 or claim 2, wherein said method further comprises a step of counting the number of reflection and a step of abandoning packets when a counted number reaches a predetermined number.

7. A routing control method in an optical packet switching network including at least first, second and third optical packet switches, said method comprising the steps of:

in said first optical packet switch, when a first output port used for sending optical packets to said second optical packet switch is in congestion and a second output port used for sending optical packets to said third optical packet switch is not in congestion, sending optical packets to be sent to said second optical packet switch to said third optical packet switch via said second output port as reflection packets;

in said third optical packet switch, returning the reflection packets received from said first optical packet switch to said first optical packet switch; and in said first optical packet switch, when said first output port is not in congestion, sending the reflection packets to said second optical packet switch via said first output port, wherein said sending step comprises selecting said second output port in random so as to provide reflection routes with transmission delay times within a predetermined range.

8. The method as claimed in claim 7, wherein said method further comprises, in said first optical packet switch, monitoring congestion conditions at said first and second output ports.

9. A routing control method in an optical packet switching network including at least first, second and third optical packet switches, said method comprising the steps of:

in said first optical packet switch, when a first output port used for sending optical packets to said second optical packet switch is in congestion and a second output port used for sending optical packets to said third optical packet switch is not in congestion, sending optical packets to be sent to said second optical packet switch to said third optical packet switch via said second output port as reflection packets;

in said third optical packet switch, returning the reflection packets received from said first optical packet switch to said first optical packet switch; and in said first optical packet switch, when said first output port is not in congestion, sending the reflection packets to said second optical packet switch via said first output port, wherein said sending step comprises sequentially selecting said second output port so as to provide reflection routes with transmission delay times within a predetermined range.

10. The method as claimed in either claim 7 or claim 9, wherein said method further comprises a step of storing the reflection packets returned from said third optical packet switch to said second output port if said first output port is in congestion, and wherein said reflection packets sending step and returning step are repeatedly performed.

11. The method as claimed in either claim 7 or claim 9, wherein said method further comprises a step of sending the reflection packets returned from said third optical packet switch earlier than packets stored in said first output port.

12. The method as claimed in either claim 7 or claim 9, wherein said method further comprises a step of counting the number of reflection and a step of abandoning packets when a counted number reaches a predetermined number.

* * * * *